(12) United States Patent
Gast et al.

(10) Patent No.: US 7,873,061 B2
(45) Date of Patent: Jan. 18, 2011

(54) SYSTEM AND METHOD FOR AGGREGATION AND QUEUING IN A WIRELESS NETWORK

(75) Inventors: Matthew Stuart Gast, San Francisco, CA (US); Richard Thomas Bennett, Livermore, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 789 days.

(21) Appl. No.: 11/648,359

(22) Filed: Dec. 28, 2006

(65) Prior Publication Data

US 2008/0159319 A1    Jul. 3, 2008

(51) Int. Cl.
*H04L 12/28* (2006.01)
(52) U.S. Cl. ............... 370/412; 370/413; 370/415; 370/389; 455/450; 455/451; 455/454
(58) Field of Classification Search ........... 370/473, 370/429, 428, 412, 413, 141, 419, 229, 395.21, 370/395.4, 395.41, 443, 468; 455/450, 451, 455/454, 422, 443; 709/245, 246, 232, 228, 709/230
See application file for complete search history.

(56) References Cited

U.S. PATENT DOCUMENTS

| | | | |
|---|---|---|---|
| 3,641,433 | A | 2/1972 | Mifflin et al. |
| 4,168,400 | A | 9/1979 | De Couasnon et al. |
| 4,176,316 | A | 11/1979 | DeRosa et al. |
| 4,247,908 | A | 1/1981 | Lockart et al. |
| 4,291,401 | A | 9/1981 | Bachmann |
| 4,291,409 | A | 9/1981 | Weinberg et al. |
| 4,409,470 | A | 10/1983 | Shepard et al. |
| 4,460,120 | A | 7/1984 | Shepard et al. |
| 4,475,208 | A | 10/1984 | Ricketts |
| 4,494,238 | A | 1/1985 | Groth |

(Continued)

FOREIGN PATENT DOCUMENTS

EP    1542 409 A1    6/2005

(Continued)

OTHER PUBLICATIONS

U.S. Appl. No. 11/690,654, filed Mar. 2007, Keenly et al.

(Continued)

*Primary Examiner*—Michael J Moore, Jr.
*Assistant Examiner*—Anez Ebrahim
(74) *Attorney, Agent, or Firm*—Perkins Coie LLP

(57) ABSTRACT

A technique for improved throughput at an access point (AP) involves when frames are received for transmission by the AP, queuing the frames for a particular station. A system constructed according to the technique may include an aggregation and queuing layer. Station queues may be processed by the aggregation and queuing layer before being given to radio hardware for transmission. In an illustrative embodiment, when frames are received by the aggregation and queuing layer, the packet will be assigned a target delivery time (TDT) and an acceptable delivery time (ADT). The TDT is the "ideal" time to transmit a frame, based on its jitter and throughput requirements. Frames are mapped on to a time axis for transmission by TDT. In an illustrative embodiment, each frame is mapped by priority, so that there are separate maps for voice, video, best effort, and background frames. There will be gaps between frames for transmission that can be used for aggregation.

22 Claims, 4 Drawing Sheets

U.S. PATENT DOCUMENTS

| | | | |
|---|---|---|---|
| 4,500,987 A | 2/1985 | Hasegawa | |
| 4,503,533 A | 3/1985 | Tobagi et al. | |
| 4,550,414 A | 10/1985 | Guinon et al. | |
| 4,562,415 A | 12/1985 | McBiles | |
| 4,630,264 A | 12/1986 | Wah | |
| 4,635,221 A | 1/1987 | Kerr | |
| 4,639,914 A | 1/1987 | Winters | |
| 4,644,523 A | 2/1987 | Horwitz | |
| 4,672,658 A | 6/1987 | Kavehrad | |
| 4,673,805 A | 6/1987 | Shepard et al. | |
| 4,707,839 A | 11/1987 | Andren et al. | |
| 4,730,340 A | 3/1988 | Frazier | |
| 4,736,095 A | 4/1988 | Shepard et al. | |
| 4,740,792 A | 4/1988 | Sagey et al. | |
| 4,758,717 A | 7/1988 | Shepard et al. | |
| 4,760,586 A | 7/1988 | Takeda | |
| 4,789,983 A | 12/1988 | Acampora et al. | |
| 4,829,540 A | 5/1989 | Waggener et al. | |
| 4,850,009 A | 7/1989 | Zook et al. | |
| 4,872,182 A | 10/1989 | McRae et al. | |
| 4,894,842 A | 1/1990 | Brockhoven et al. | |
| 4,901,307 A | 2/1990 | Gilhousen et al. | |
| 4,933,952 A | 6/1990 | Albrieux et al. | |
| 4,933,953 A | 6/1990 | Yagi | |
| 4,995,053 A | 2/1991 | Simpson et al. | |
| 5,008,899 A | 4/1991 | Yamamoto | |
| 5,029,183 A | 7/1991 | Tymes | |
| 5,103,459 A | 4/1992 | Gilhousen et al. | |
| 5,103,461 A | 4/1992 | Tymes | |
| 5,109,390 A | 4/1992 | Gilhousen et al. | |
| 5,142,550 A | 8/1992 | Tymes | |
| 5,151,919 A | 9/1992 | Dent | |
| 5,157,687 A | 10/1992 | Tymes | |
| 5,187,675 A | 2/1993 | Dent et al. | |
| 5,231,633 A | 7/1993 | Hluchyj et al. | |
| 5,280,498 A | 1/1994 | Tymes et al. | |
| 5,285,494 A | 2/1994 | Sprecher et al. | |
| 5,329,531 A | 7/1994 | Diepstraten | |
| 5,418,812 A | 5/1995 | Reyes et al. | |
| 5,448,569 A | 9/1995 | Huang et al. | |
| 5,450,615 A | 9/1995 | Fortune et al. | |
| 5,465,401 A | 11/1995 | Thompson | |
| 5,479,441 A | 12/1995 | Tymes et al. | |
| 5,483,676 A | 1/1996 | Mahany et al. | |
| 5,491,644 A | 2/1996 | Pickering et al. | |
| 5,517,495 A | 5/1996 | Lund | |
| 5,519,762 A | 5/1996 | Bartlett | |
| 5,528,621 A | 6/1996 | Heiman et al. | |
| 5,561,841 A | 10/1996 | Markus | |
| 5,568,513 A | 10/1996 | Croft et al. | |
| 5,584,048 A | 12/1996 | Wieczorek | |
| 5,598,532 A | 1/1997 | Liron | |
| 5,630,207 A | 5/1997 | Gitlin et al. | |
| 5,640,414 A | 6/1997 | Blakeney et al. | |
| 5,649,289 A | 7/1997 | Wang et al. | |
| 5,668,803 A | 9/1997 | Tymes et al. | |
| 5,729,542 A | 3/1998 | Dupont | |
| 5,742,592 A | 4/1998 | Scholefield et al. | |
| 5,793,303 A | 8/1998 | Koga | |
| 5,794,128 A | 8/1998 | Brocket et al. | |
| 5,812,589 A | 9/1998 | Sealander et al. | |
| 5,815,811 A | 9/1998 | Pinard et al. | |
| 5,828,653 A | 10/1998 | Goss | |
| 5,828,960 A | 10/1998 | Tang et al. | |
| 5,838,907 A | 11/1998 | Hansen | |
| 5,844,900 A | 12/1998 | Hong et al. | |
| 5,872,968 A | 2/1999 | Knox et al. | |
| 5,875,179 A | 2/1999 | Tikalsky | |
| 5,896,561 A | 4/1999 | Schrader et al. | |
| 5,915,214 A | 6/1999 | Reece et al. | |
| 5,920,821 A | 7/1999 | Seazholtz et al. | |
| 5,933,607 A | 8/1999 | Tate et al. | |
| 5,949,988 A | 9/1999 | Feisullin et al. | |
| 5,953,669 A | 9/1999 | Stratis et al. | |
| 5,960,335 A | 9/1999 | Umemoto et al. | |
| 5,982,779 A | 11/1999 | Krishnakumar et al. | |
| 5,987,062 A | 11/1999 | Engwer et al. | |
| 5,987,328 A | 11/1999 | Ephremides et al. | |
| 6,005,853 A | 12/1999 | Wang et al. | |
| 6,011,784 A | 1/2000 | Brown | |
| 6,078,568 A | 6/2000 | Wright | |
| 6,088,591 A | 7/2000 | Trompower et al. | |
| 6,115,390 A | 9/2000 | Chuah | |
| 6,119,009 A | 9/2000 | Baranger et al. | |
| 6,154,776 A | 11/2000 | Martin | |
| 6,160,804 A | 12/2000 | Ahmed et al. | |
| 6,188,694 B1 | 2/2001 | Fine et al. | |
| 6,199,032 B1 | 3/2001 | Anderson | |
| 6,208,629 B1 | 3/2001 | Jaszewski et al. | |
| 6,208,841 B1 | 3/2001 | Wallace et al. | |
| 6,218,930 B1 | 4/2001 | Katzenberg et al. | |
| 6,240,078 B1 | 5/2001 | Kuhnel et al. | |
| 6,240,083 B1 | 5/2001 | Wright | |
| 6,256,300 B1 | 7/2001 | Ahmed et al. | |
| 6,256,334 B1 | 7/2001 | Adachi | |
| 6,285,662 B1 | 9/2001 | Watannabe | |
| 6,317,599 B1 | 11/2001 | Rappaport et al. | |
| 6,336,035 B1 | 1/2002 | Somoza et al. | |
| 6,336,152 B1 | 1/2002 | Richman et al. | |
| 6,347,091 B1 | 2/2002 | Wallentin et al. | |
| 6,356,758 B1 | 3/2002 | Almeida et al. | |
| 6,393,290 B1 | 5/2002 | Ufongene | |
| 6,404,772 B1 | 6/2002 | Beach et al. | |
| 6,446,206 B1 | 9/2002 | Feldbaum | |
| 6,470,025 B1 | 10/2002 | Wilson et al. | |
| 6,473,449 B1 | 10/2002 | Cafarella et al. | |
| 6,493,679 B1 | 12/2002 | Rappaport et al. | |
| 6,496,290 B1 | 12/2002 | Lee | |
| 6,512,916 B1 | 1/2003 | Forbes, Jr. | |
| 6,567,146 B2 | 5/2003 | Hirakata et al. | |
| 6,567,416 B1 | 5/2003 | Chuah | |
| 6,580,700 B1 | 6/2003 | Pinard et al. | |
| 6,587,680 B1 | 7/2003 | Ala-Laurila et al. | |
| 6,614,787 B1 | 9/2003 | Jain et al. | |
| 6,625,454 B1 | 9/2003 | Rappaport et al. | |
| 6,631,267 B1 | 10/2003 | Clarkson et al. | |
| 6,659,947 B1 | 12/2003 | Carter et al. | |
| 6,678,802 B2 | 1/2004 | Hickson | |
| 6,687,498 B2 | 2/2004 | McKenna et al. | |
| 6,721,334 B1 * | 4/2004 | Ketcham | 370/473 |
| 6,725,260 B1 | 4/2004 | Philyaw | |
| 6,747,961 B1 | 6/2004 | Ahmed et al. | |
| 6,839,338 B1 | 1/2005 | Amara et al. | |
| 6,879,812 B2 | 4/2005 | Agrawal et al. | |
| 6,937,566 B1 | 8/2005 | Forslow | |
| 6,973,622 B1 | 12/2005 | Rappaport et al. | |
| 6,978,301 B2 | 12/2005 | Tindal | |
| 7,020,773 B1 | 3/2006 | Otway et al. | |
| 7,035,220 B1 * | 4/2006 | Simcoe | 370/236 |
| 7,062,566 B2 | 6/2006 | Amara et al. | |
| 7,110,756 B2 | 9/2006 | Diener | |
| 7,126,913 B1 * | 10/2006 | Patel et al. | 370/230.1 |
| 7,155,518 B2 | 12/2006 | Forslow | |
| 7,293,136 B1 | 11/2007 | More et al. | |
| 7,382,756 B2 | 6/2008 | Barber et al. | |
| 7,421,487 B1 | 9/2008 | Peterson et al. | |
| 7,440,416 B2 | 10/2008 | Mahany et al. | |
| 7,475,130 B2 | 1/2009 | Silverman | |
| 7,724,704 B2 | 5/2010 | Simons et al. | |
| 2002/0021701 A1 | 2/2002 | Lavian et al. | |
| 2002/0052205 A1 | 5/2002 | Belostofsky et al. | |
| 2002/0069278 A1 | 6/2002 | Forslow | |
| 2002/0080790 A1 * | 6/2002 | Beshai | 370/392 |
| 2002/0087699 A1 | 7/2002 | Karagiannis et al. | |

| | | |
|---|---|---|
| 2002/0095486 A1 | 7/2002 | Bahl |
| 2002/0101868 A1 | 8/2002 | Clear et al. |
| 2002/0116655 A1 | 8/2002 | Lew et al. |
| 2002/0191572 A1 | 12/2002 | Weinstein et al. |
| 2003/0014646 A1 | 1/2003 | Buddhikot et al. |
| 2003/0018889 A1 | 1/2003 | Burnett et al. |
| 2003/0107590 A1 | 6/2003 | Levillain et al. |
| 2003/0120764 A1 | 6/2003 | Laye et al. |
| 2003/0174706 A1 | 9/2003 | Shankar et al. |
| 2003/0193910 A1 | 10/2003 | Shoaib et al. |
| 2003/0204596 A1 | 10/2003 | Yadav |
| 2004/0025044 A1 | 2/2004 | Day |
| 2004/0029580 A1 | 2/2004 | Haverinen et al. |
| 2004/0030777 A1 | 2/2004 | Reedy et al. |
| 2004/0047320 A1 | 3/2004 | Eglin |
| 2004/0054774 A1 | 3/2004 | Barber et al. |
| 2004/0064560 A1 | 4/2004 | Zhang et al. |
| 2004/0078598 A1 | 4/2004 | Barber et al. |
| 2004/0095914 A1 | 5/2004 | Katsube et al. |
| 2004/0095932 A1 | 5/2004 | Astarabadi et al. |
| 2004/0143428 A1 | 7/2004 | Rappaport et al. |
| 2004/0184475 A1 | 9/2004 | Meier |
| 2004/0221042 A1 | 11/2004 | Meier |
| 2004/0230370 A1 | 11/2004 | Tzamaloukas |
| 2004/0233234 A1 | 11/2004 | Chaudhry et al. |
| 2004/0236702 A1 | 11/2004 | Fink et al. |
| 2004/0246937 A1 | 12/2004 | Duong et al. |
| 2004/0259555 A1 | 12/2004 | Rappaport et al. |
| 2005/0025105 A1 | 2/2005 | Rue |
| 2005/0030894 A1 | 2/2005 | Stephens |
| 2005/0030929 A1 | 2/2005 | Swier et al. |
| 2005/0058132 A1 | 3/2005 | Okano et al. |
| 2005/0059405 A1 | 3/2005 | Thomson et al. |
| 2005/0059406 A1 | 3/2005 | Thomson et al. |
| 2005/0064873 A1 | 3/2005 | Karaoguz et al. |
| 2005/0068925 A1 | 3/2005 | Palm et al. |
| 2005/0073980 A1 | 4/2005 | Thomson et al. |
| 2005/0078644 A1 | 4/2005 | Tsai et al. |
| 2005/0128989 A1 | 6/2005 | Bhagwat et al. |
| 2005/0157730 A1 | 7/2005 | Grant et al. |
| 2005/0175027 A1 | 8/2005 | Miller et al. |
| 2005/0180358 A1* | 8/2005 | Kolar et al. .......... 370/331 |
| 2005/0181805 A1 | 8/2005 | Gallagher |
| 2005/0193103 A1 | 9/2005 | Drabik |
| 2005/0223111 A1 | 10/2005 | Bhandaru et al. |
| 2005/0240665 A1 | 10/2005 | Gu et al. |
| 2005/0259597 A1 | 11/2005 | Benedetotto et al. |
| 2005/0273442 A1 | 12/2005 | Bennett |
| 2005/0276218 A1 | 12/2005 | Ooghe et al. |
| 2006/0045050 A1 | 3/2006 | Floros et al. |
| 2006/0143496 A1 | 6/2006 | Silverman |
| 2006/0200862 A1 | 9/2006 | Olson et al. |
| 2006/0285489 A1 | 12/2006 | Francisco et al. |
| 2006/0292992 A1* | 12/2006 | Tajima et al. .......... 455/67.11 |
| 2007/0011318 A1 | 1/2007 | Roth |
| 2007/0086398 A1 | 4/2007 | Tiwari |
| 2007/0171909 A1 | 7/2007 | Pignatelli |
| 2007/0230457 A1 | 10/2007 | Kodera et al. |
| 2007/0248009 A1* | 10/2007 | Petersen .......... 370/230 |
| 2007/0286208 A1 | 12/2007 | Kanada et al. |
| 2007/0297329 A1 | 12/2007 | Park et al. |
| 2008/0013481 A1 | 1/2008 | Simons et al. |
| 2009/0059930 A1 | 3/2009 | Ryan et al. |

FOREIGN PATENT DOCUMENTS

| | | |
|---|---|---|
| WO | WO94/03986 | 2/1994 |
| WO | WO99/11003 | 3/1999 |
| WO | WO 03/085544 A1 | 10/2003 |
| WO | WO 2004/095192 A2 | 11/2004 |
| WO | WO 2004/095800 A1 | 11/2004 |

OTHER PUBLICATIONS

U.S. Appl. No. 11/801,964, filed May 2007, Simone et al.
U.S. Appl. No. 11/845,029, filed Aug. 2007, Gast, Mathew S.
U.S. Appl. No. 11/852,234, filed Sep. 2007, Gast et al.
U.S. Appl. No. 11/944,346, filed Nov. 2007, Gast, Mathew S.
U.S. Appl. No. 11/966,912, filed Dec. 2007, Chesnutt et al.
U.S. Appl. No. 11/970,484, filed Jan. 2008, Gast, Mathew S.
U.S. Appl. No. 11/975,134, filed Oct. 2007, Aragon et al.
U.S. Appl. No. 12/077,051, filed Mar. 2008, Gast, Mathew S.
Puttini, R., Percher, J., Me, L., and de Sousa, R. 2004. A fully distributed IDS for MANET. In *Proceedings of the Ninth international Symposium on Computers and Communications 2004 vol. 2 (Iscc "04)*—vol. 02 (Jun. 28-Jul. 1, 2004). ISCC. IEEE Computer Society, Washington, DC, 331-338.
U.S. Appl. No. 11/326,966, filed Jan. 5, 2006, Taylor.
U.S. Appl. No. 11/330,877, filed Jan. 11, 2006, Matta.
U.S. Appl. No. 11/331,789, filed Jan. 14, 2006, Matta, et al.
U.S. Appl. No. 11/351,104, filed Feb. 8, 2006, Tiwari.
U.S. Appl. No. 11/377,859, filed Mar. 15, 2006, Harkins.
U.S. Appl. No. 11/400,165, filed Apr. 5, 2006, Tiwari.
U.S. Appl. No. 11/445,750, filed May 3, 2006, Matta.
U.S. Appl. No. 11/417,830, filed May 30, 2006.
U.S. Appl. No. 11/417,993, filed May 3, 2006, Jar et al.
U.S. Appl. No. 11/437,537, filed May 19, 2006, Freund et al.
U.S. Appl. No. 11/437,538, filed May 19, 2006, Zeldin.
U.S. Appl. No. 11/437,387, filed May 19, 2006, Zeldin et al.
U.S. Appl. No. 11/437,582, filed May 19, 2006, Bugwadia et al.
U.S. Appl. No. 11/451,704, filed Jun. 12, 2006, Riley.
U.S. Appl. No. 11/588,848, filed Oct. 26, 2006, Zeldin et al.
U.S. Appl. No. 11/588,849, filed Oct. 26, 2006, Zeldin et al.
U.S. Appl. No. 11/588,878, filed Oct. 26, 2006, Zeldin et al.
U.S. Appl. No. 11/592,891, filed Nov. 22, 2006, Zeldin et al.
U.S. Appl. No. 11/595,119, filed Nov. 10, 2006, Murphy.
U.S. Appl. No. 11/604,075, filed Nov. 22, 2006, Murphy et al.
U.S. Appl. No. 11/326,966, filed Jan. 2006, Taylor.
U.S. Appl. No. 11/330,877, filed Jan. 2006, Matta.
U.S. Appl. No. 11/331,789, filed Jan. 2006, Matta, et al.
U.S. Appl. No. 11/351,104, filed Feb. 2006, Tiwari.
U.S. Appl. No. 11/377,859, filed Mar. 2006, Harkins.
U.S. Appl. No. 11/400,165, filed Apr. 2006, Tiwari.
U.S. Appl. No. 11/445,750, filed May 2006, Matta.
U.S. Appl. No. 11/417,830, filed May 2006, Morain.
U.S. Appl. No. 11/417,993, filed May 2006, Jar et al.
U.S. Appl. No. 11/437,537, filed May 2006, Freund et al.
U.S. Appl. No. 11/437,538, filed May 2006, Zeldin.
U.S. Appl. No. 11/437,387, filed May 2006, Zeldin et al.
U.S. Appl. No. 11/437,582, filed May 2006, Bugwadia et al.
U.S. Appl. No. 11/451,704, filed Jun. 2006, Riley.
U.S. Appl. No. 11/588,848, filed Oct. 2006, Zeldin et al.
U.S. Appl. No. 11/588,849, filed Oct. 2006, Zeldin et al.
U.S. Appl. No. 11/588,878, filed Oct. 2006, Zeldin et al.
U.S. Appl. No. 11/592,891, filed Nov. 2006, Zeldin et al.
U.S. Appl. No. 11/595,119, filed Nov. 2006, Murphy, James.
U.S. Appl. No. 11/604,075, filed Nov. 2006, Murphy et al.
Acampora and Winters, IEEE Communications Magazine, 25(8):11-20 (1987).
Acampora and Winters, IEEE Journal on selected Areas in Communications. *SAC-5*:796-804 (1987).
Bing and Subramanian, IEEE, 1318-1322 (1997).
Durgin, et al., "Measurements and Models for Radio Path Loss and Penetration Loss in and Around Homes and Trees at 5.85 GHz", IEEE Transactions on Communications, vol. 46, No. 11, Nov. 1998.
Freret et al., Applications of Spread-Spectrum Radio to Wireless Terminal Communications, Conf. Record, Nat'l Telecom. Conf., Nov. 30-Dec. 4, 1980.
Fortune et al., IEEE Computational Science and Engineering, "Wise Design of Indoor Wireless Systems: Practical Computation and Optimization", p. 58-68 (1995).

Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.

Ho et al., "Antenna Effects on Indoor Obstructed Wireless Channels and a Deterministic Image-Based Wide-Based Propagation Model for In-Building Personal Communications Systems", International Journal of-Wireless Information Networks, vol. 1, No. 1, 1994.

Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.

Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Useres", (1977).

LAN/MAN Standars Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).

Okamoto and Xu, IEEE, Proceeding so of the 13$^{th}$ Annual Hawaii International Conference on System Sciences, pp. 54-63 (1997).

Panjwani et al., "Interactive Computation of Coverage Regions for Wireless Communication in Multifloored Indoor Environments", IEEE Journal on Selected Areas in Communications, vol. 14, No. 3, Apr. 1996.

Perram and Martinez, "Technology Developments for Low-Cost Residential Alarm Systems", Proceedings 1977 Carnahan Conference on Crime Countermeasures, Apr. 6-8, pp. 45-50 (1977).

Piazzi et al., "Achievable Accuracy of Site-Specific Path-Loss Predictions in Residential Environments", IEEE Transactions on Vehicular Technology, vol. 48, No. 3, May 1999.

Seidel et al., "Site-Specific Propagation Prediction for Wireless In-Building Personal Communications System Design", IEEE Transactions on Vehicular Technology, vol. 43, No. 4, Nov. 1994.

Skidmore et al., "Interactive Coverage Region and System Design Simulation for Wireless Communication Systems in Multi-floored Indoor Environments, SMT Plus" IEEE ICUPC '96 Proceedings (1996).

Ullmo et al., "Wireless Propagation in Buildings: A Statistic Scattering Approach", IEEE Transactions on Vehicular Technology, vol. 48, No. 3, May 1999.

Co-pending U.S. Appl. No. 11/845,029, filed Aug. 24, 2007.
Co-pending U.S. Appl. No. 12/077,051, filed Mar. 14, 2008.
Co-pending U.S. Appl. No. 12/113,535, filed May 1, 2008.
Co-pending U.S. Appl. No. 11/852,234, filed Sep. 7, 2007.
Co-pending U.S. Appl. No. 11/970,484, filed Jan. 7, 2008.
Co-pending U.S. Appl. No. 12/172,195, filed Jul. 11, 2008.
Co-pending U.S. Appl. No. 12/210,917, filed Sep. 15, 2008.

Final Office Action Mailed Jan. 25, 2010, in Co-pending U.S. Appl. No. 11/845,029, filed Aug. 24, 2007.

Non-Final Office Action Mailed Jan. 21, 2010, in Co-pending U.S. Appl. No. 11/852,234, filed Sep. 7, 2007.

Law, A., "New Service Discovery Protocol," Internet Citation [Online] XP002292473 Retrieved from the Internet: URL:/http://sern.uccalgary.ca/{ Iawa/SENG60921/arch/SDP.htm> [retrieved Aug. 12, 2004] the whole document.

Non-Final Office Action Mailed May 14, 2010, in Co-pending U.S. Appl. No. 11/845,029 filed Aug. 24, 2007.

Non-Final Office Action Mailed Jul. 9, 2010, in Co-pending U.S. Appl. No. 11/845,029 filed Aug. 24, 2007.

Non-Final Office Action Mailed Jun. 29, 2010, in Co-pending U.S. Appl. No. 11/852,234 filed Sep. 7, 2007.

Non-Final Office Action Mailed Jun. 1, 2010, in Co-pending U.S. Appl. No. 12/172,195 filed Jul. 11, 2007.

International Search Report PCT/US07/19696 dated Feb. 29, 2008, pp. 1-3.

Written Opinion PCT/US07/19696 dated Feb. 29, 2008, pp. 1-5.

International Search Report PCT/US08/010708 dated May 18, 2009, pp. 1-6.

Written Opinion PCT/US08/010708 dated May 18, 2009, pp. 1-12.

* cited by examiner

SYSTEM AND METHOD FOR AGGREGATION AND QUEUING IN A WIRELESS NETWORK

BACKGROUND

Wireless networks often have lower throughput than their wired counterparts due to a relatively noisy network medium. Digital radio networks typically need extensive preambles to set up a receiver. This effect is especially pronounced in OFDM networks because each subcarrier on the channel needs individual setup. The unfortunate side-effect of preamble transmission is that it requires time. This overhead can potentially dramatically reduce the time available on the medium for transmitting user data.

One of the ways to improve the speed of a packet-based network is to transmit larger packets. Larger packets are able to "amortize" the overhead over larger numbers of data bits, and are thus more efficient. 802.11n makes extensive use of aggregation to improve transmission efficiency. However, the standard does not specify when frames will be aggregated, or how large they should be.

These are but a subset of the problems and issues associated with wireless access point authentication, and are intended to characterize weaknesses in the prior art by way of example. The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for improved throughput at an access point (AP) involves when frames are received for transmission by the AP, queuing the frames for a particular station. In an illustrative embodiment, each station's frames are held in four sub-queues, which represent the four "standard" priorities in 802.11 (voice, video, best effort, and background).

A system constructed according to the technique may include an aggregation and queuing layer. Station queues may be processed by the aggregation and queuing layer before being given to radio hardware for transmission. In an illustrative embodiment, when frames are received by the aggregation and queuing layer, the packet will be assigned a target delivery time (TDT) and an acceptable delivery time (ADT). The TDT is the "ideal" time to transmit a frame, based on its jitter and throughput requirements. For example, it is ideal that a frame belonging to a G.711 voice call is transmitted 20 ms after the previous frame. The ADT is the latest that a frame may be transmitted and still be acceptable. In some cases, the ADT and TDT may be very close. An example would be a voice station that has small jitter buffers, and requires that the network reduce jitter.

In an illustrative embodiment, TDT and ADT are assigned by the queue manager based on the type of traffic and its characteristics. When a station first connects to the network, it may specify bandwidth through a traffic specification (TSPEC), a feature of the 802.11 protocol that allows a station to specify the characteristics of the traffic that may be sent. It is also possible to configure characteristics administratively, by configuring a target jitter amount for voice traffic as part of the system configuration.

To decide which frame to transmit, the queue manager may look at the outstanding frames in the queue. Frames are mapped on to the time axis for transmission by TDT. In an illustrative embodiment, each frame is mapped by priority, so that there are separate maps for voice, video, best effort, and background frames. There will be gaps between frames for transmission that can be used for aggregation.

The proposed system can offer, among other advantages, improved AP throughput. This and other advantages of the techniques described herein will become apparent to those skilled in the art upon a reading of the following descriptions and a study of the several figures of the drawings.

BRIEF DESCRIPTION OF THE DRAWINGS

Embodiments of the invention are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
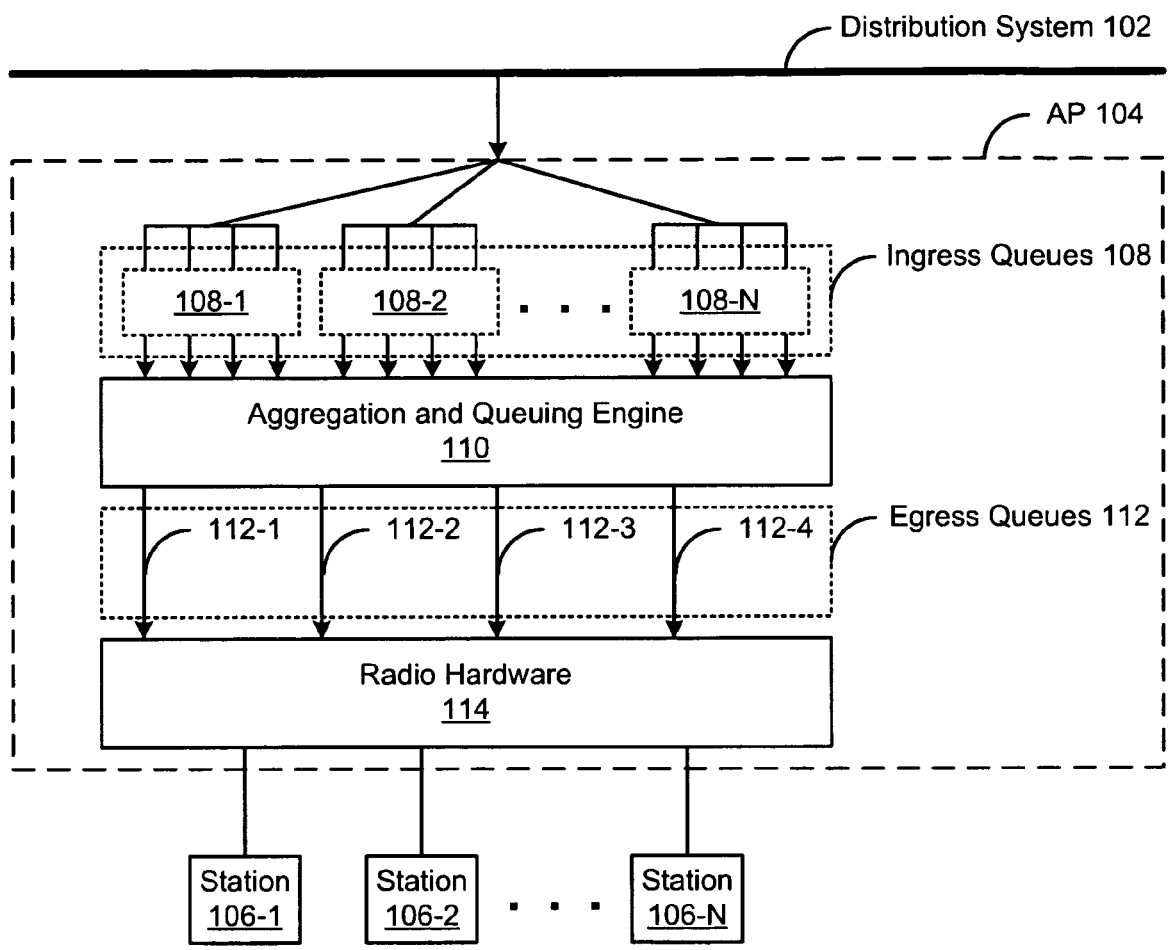
FIG. 1 depicts an example of a system including an access point (AP) with an aggregation and queuing layer.

FIG. 1 depicts an example of a system 100 including an access point (AP) with an aggregation and queuing layer. The system 100 includes a distribution system 102 and an AP 104. The distribution system 102 may include one or more wireless switches (not shown), such as, by way of example but not limitation, Trapeze Networks, Inc. MOBILITY EXCHANGE™ (or MX®) switches. However, any applicable known or convenient distribution system that is capable of coupling APs of a wireless network together could be used. In an illustrative embodiment, the distribution system 102 is coupled to, by way of example but not limitation, a wired network. Typically, though not necessarily, the wired network is coupled to the Internet.

The AP 104 may include, by way of example but not limitation, a Trapeze Networks, Inc. MOBILITY POINT™ (or MP®) AP. However, any applicable known or convenient AP that is capable of coupling a wireless device (or station) to the distribution system 102 could be used. It may be noted that a station could include an AP. A wireless AP that is coupled to the distribution system 102 through one the AP 104 may be referred to as an untethered AP.

It should be noted that not all technologies include the term AP in the literature. For example, SGSN technology does not refer to an access point as an "AP." However, all wireless access technologies require something comparable (i.e., a node at which wireless communications are received and/or transmitted). For example, an independent basic service set (BSS) includes stations that access the service area by directly communicating with one another; thus, the access nodes are the stations themselves. Accordingly, AP is considered to be generally applicable to any technology, regardless of actual verbiage used to describe a BSS with equivalent functionality.

In the example of FIG. 1, the AP 104 may be associated with a BSS. Together with other APs supported by the distribution system 102, the AP 104 may be associated with an extended service set (ESS). In an illustrative embodiment, all APs of an ESS would likely have the same service set identifier (ssid), which serves as a network "name." In addition, each of the APs would likely have a unique BSS identifier (bssid), which serves as a station "name." (Some stations may have multiple bssids.) Although this is common for networks that include an ESS, literature may refer to equivalent identifiers in alternative network implementations or when using different technologies using different terminology. Applicable techniques described herein would still apply.

As used herein, the term "wireless domain" is intended to include a BSS, ESS, network implementations or technologies using different terminology, or any other applicable wireless network. The wireless domain may include, by way of example but not limitation, a Trapeze Networks, Inc. MOBILITY DOMAIN™ wireless domain. The wireless domain includes the AP 104 and may include other APs (not shown).

In the example of FIG. 1, stations 106-1 to 106-N (referred to collectively as stations 106) are depicted for illustrative purposes. The AP 104 forwards traffic from the distribution system 102 to the stations 106, and vice versa. (Some traffic may or may not have the AP 104 as the final destination.) Since the distribution system 102 and the AP 104 are coupled via a wire connection, and the AP 104 and the stations 106 are wirelessly connected, the aggregation and queuing techniques that are used, if any, may be different. Herein, it is assumed that some appropriate known or convenient technique is used to send traffic from the AP 104 to the distribution system 102.

In the example of FIG. 1, the stations 106 associate with the AP 104. The stations 106 may be practically any known or convenient device that is capable of communicating with a wireless network, such as, by way of example but not limitation, a pda, cell phone, laptop, or untethered AP. The stations 106, as used herein, may be referred to as devices with a media access control (MAC) address and a physical layer (PHY) interface to the wireless medium that comply with the IEEE 802.11 standard, or some other known or convenient standard, such as IEEE 802.15 or a proprietary wireless standard. Similarly, in some embodiments, the AP 104 is, at least technically, a station.

In the example of FIG. 1, the AP 104 includes ingress queues 108-1 to 108-N (referred to collectively as ingress queues 108), an aggregation and queuing engine 110, a plurality of egress queues 112-1, 112-2, 112-3, 112-4 (referred to collectively as egress queues 112), and radio hardware 114. In an illustrative embodiment, each of the stations 106 is associated with a respective one of the ingress queues 108. At any given time, the ingress queues 108 may or may not have the same number of queues as stations 106. However, for illustrative purposes, it is assumed that an ingress queue is associated with each of the stations 106.

In the example of FIG. 1, each of the ingress queues 108 has four sub-queues. In an illustrative embodiment, the sub-queues represent the four "standard" priorities in 802.11 (i.e., voice, video, best effort, and background). However, the actual number of sub-queues 114 is implementation-specific. For example, even if there are four priorities, in an implementation, it may be decided to merge background QoS with best effort QoS, since background traffic is rarely used (for whatever reason). In such an implementation, there would only be three sub-queues. As another example, in an implementation, it could be decided that video QoS could be subdivided into two QoS subtypes such that video can have either a first priority or a second priority. The determination could be based on, for example, administrative privileges or relative stature within an enterprise of the sender or receiver of the video traffic. As another example, it could be determined that an entirely new priority queue system should be used that has little to do with the "standard" priorities in 802.11.

It should be noted that the actual logic and allocation of resources toward implementation of the ingress queues 108 may vary. For example, each of the queues 108 may have four allocated sub-queues for a total of 4*N allocated [sub]queues. Alternatively, in another embodiment, all traffic could be enqueued in four sub-queues, without considering the destination of the traffic. Alternatively, in another embodiment, all traffic could be enqueued in a single queue, with, e.g., indicators identifying priority. Thus, although the traffic may be logically divided into N queues of 4 sub-queues, the relevant techniques described herein should be applicable regardless of the actual implementation. The ingress queues 108 may be embodied in a computer-readable medium, implemented in hardware, or some combination thereof.

The traffic enqueued on the ingress queues 108 is in the form of units of traffic. Units of traffic may include packets, frames, or some other unit. For illustrative simplicity, the term packet is used herein to describe any unit of traffic, though this could include frames or some other synchronous or asynchronous unit of traffic, and is not intended to limit the description to one or another of the OSI layers, or a particular technology or protocol.

In an illustrative embodiment, the aggregation and queuing engine 110 is embodied in a computer-readable medium. As would be known to one of ordinary skill in the computer arts, a processor would be used to run executable code on the computer-readable medium or to access data and/or executable code on the computer-readable medium. In a non-limiting embodiment, when a packet is received by the aggregation and queuing engine 110, the packet is assigned a target delivery time (TDT) and an acceptable delivery time (ADT). The TDT is the "ideal" time to transmit a packet, based on, by way of example but not limitation, jitter and throughput requirements for the packet. For example, it may be considered ideal that a packet belonging to a G.711 voice call is transmitted 20 ms after the previous packet. The ADT is the latest that a packet may be transmitted and still be acceptable. In some cases, the ADT and TDT may be very close. An example would be a voice station that has small jitter buffers, and requires that the network reduce jitter.

TDT and ADT are assigned by the aggregation and queuing engine 110 based on, by way of example but not limitation, the type of traffic and its characteristics. In a specific non-limiting embodiment, when a station first connects to the network, it may specify bandwidth through a traffic specification (TSPEC), a feature of the 802.11 protocol that allows a station to specify the characteristics of the traffic that may be sent. It is also possible to configure characteristics administratively, by configuring a target jitter amount for voice traffic as part of the system configuration.

The aggregation and queuing engine 110 is useful primarily to aggregate traffic from the ingress queues 108 and enqueue the traffic on the egress queues 112 for transmission to the stations 106. To decide which packet to transmit, the aggregation and queuing engine 110 looks at the outstanding packets in the ingress queues 108. Packets are mapped on to a time axis for transmission by TDT. In a non-limiting embodiment, each packet is mapped by priority, so that there are separate maps for, by way of example but not limitation, voice, video, best effort, and background packets. There will be gaps between packets for transmission that can be used for aggregation. After aggregation, if any, the packets are enqueued on the egress queues 112.

In the example of FIG. 1, the four egress queues 112 are associated with the four "standard" priorities in 802.11 (i.e., voice, video, best effort, and background), implemented in a manner similar (though not necessarily the same as) that described above with reference to the ingress queues 108. The actual number of egress queues 112 is implementation-specific, and may be different from the number of sub-queues of the ingress queues 108. For example there may be four sub-queues for the ingress queues 108, but the aggregation and queuing engine 110 outputs only three (e.g., voice, video, and best effort/background).

In the example of FIG. 1, the egress queues 112 are coupled to the radio hardware 114. The radio hardware 114 may include one or more radios. Any applicable known or convenient radio hardware that is capable of sending a wireless packet from the AP 104 to one or more of the stations 106 may be used. The radio hardware 114 may or may not also receive wireless traffic from one or more of the stations 106.

Figure 2:
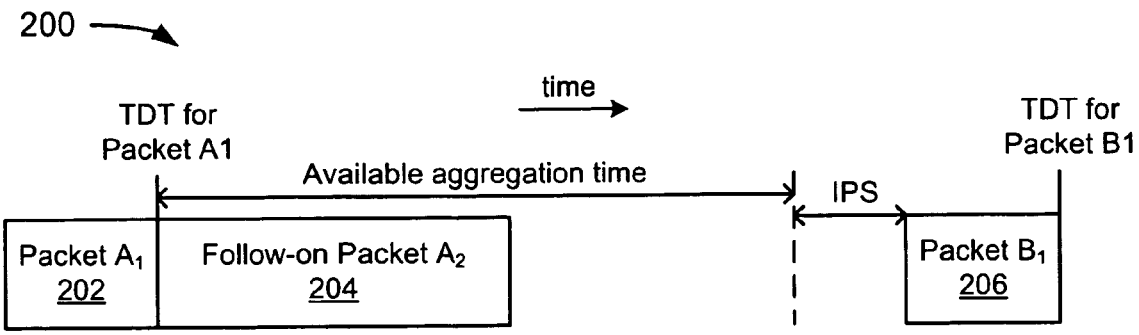
FIG. 2 depicts a conceptual diagram that is intended to illustrate tail aggregation.

FIG. 2 depicts a conceptual diagram 200 that is intended to illustrate tail aggregation. In the example of FIG. 2, the diagram 200 includes a packet $A_1$ 202, a follow-on packet $A_2$ 204, and a packet $B_1$ 206. For illustrative purposes, the packet $A_1$ 202 is being sent to station A (not shown), the packet $A_2$ 204 is being sent to station A, and the packet $B_1$ 206 is being sent to station B (not shown). The packets $A_1$, $A_2$, $B_1$ are scheduled for transmission at respective TDTs by a queue/aggregation manager. Between packets is a gap of available airtime, including a first portion that may be referred to as available aggregation time and a second portion that may be referred to as an inter-packet space (IPS). In the example of FIG. 2, time flows to the right.

Packet $A_1$ 202 and packet $B_1$ 206 have a sufficiently high priority that they are scheduled to ensure that they are sent prior to their respective TDTs, if at all possible. In this example, the packet $A_2$ 204 is scheduled for sending later. However, the gap of available airtime between packet $A_1$ 202 and packet $B_1$ 206 could be used to schedule another packet that is bound for station A, in this example the packet $A_2$ 204, by aggregating the packet $A_1$ 202 and the packet $A_2$ 204.

A packet that is available in the queue for Station A can be transmitted as part of an aggregated packet to Station A, so long as the aggregated packet leaves at least an IPS between the aggregated packet and the packet $B_1$ 206. In other words, in an illustrative embodiment, when computing the available time for aggregation, one should leave space for the IPS. (In practice, it may be necessary to transmit the entire aggregate by the TDT of any component packet so that subframes within the aggregate are available.) It is likely that the aggregate is formed by taking a lower-priority packet and allowing it to ride on the end of the high-priority packet, though this is not necessarily a requirement.

Figure 3:
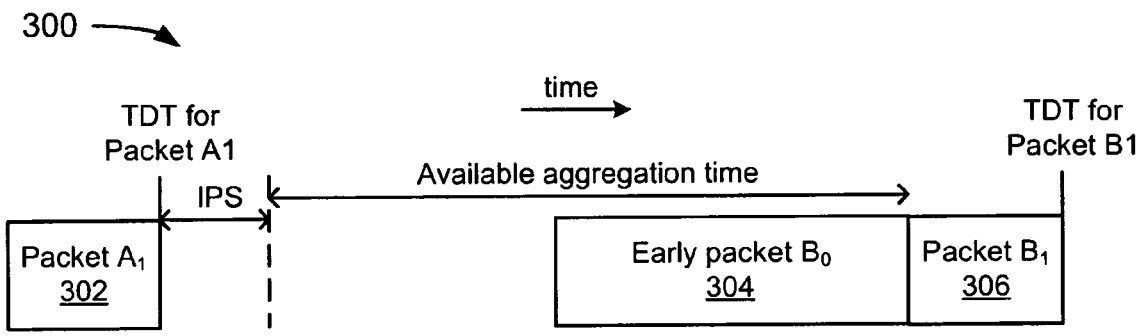
FIG. 3 depicts a conceptual diagram that is intended to illustrate head aggregation.

FIG. 3 depicts a conceptual diagram 300 that is intended to illustrate head aggregation. In the example of FIG. 3, the diagram 300 includes a packet $A_1$ 302, a packet $B_0$ 304, and a packet $B_1$ 306. In this example, the available aggregation time is computed similarly to that of tail aggregation (FIG. 2), but in the gap of available airtime between the packet $A_1$ 302 and the packet $B_1$ 306, the packet $B_0$ 304 is prepended to the packet $B_1$ 306. The order of the packets within the aggregate is not important. For instance, in the example of FIG. 3, the packet $B_0$ 304 is prepended to the packet $B_1$. However, since, in an illustrative embodiment, the packet $B_1$ 306 has a higher priority that the packet $B_0$ 304, in at least some implementations the packet $B_0$ 304 will actually be appended, and the packet $B_1$ 306 placed at the front of the aggregated packet $B_0+B_1$. This ensures that higher priority packets are at the front of an aggregated packet, ensuring they are received first at the target station.

Aggregated packets including high-priority data should be transmitted with high priority as well, though this is actually an implementation-specific decision. However, sending aggregated packets at the highest priority of the sub-packets has beneficial effects for reducing overhead because fewer backoff slots will be used.

Figure 4:
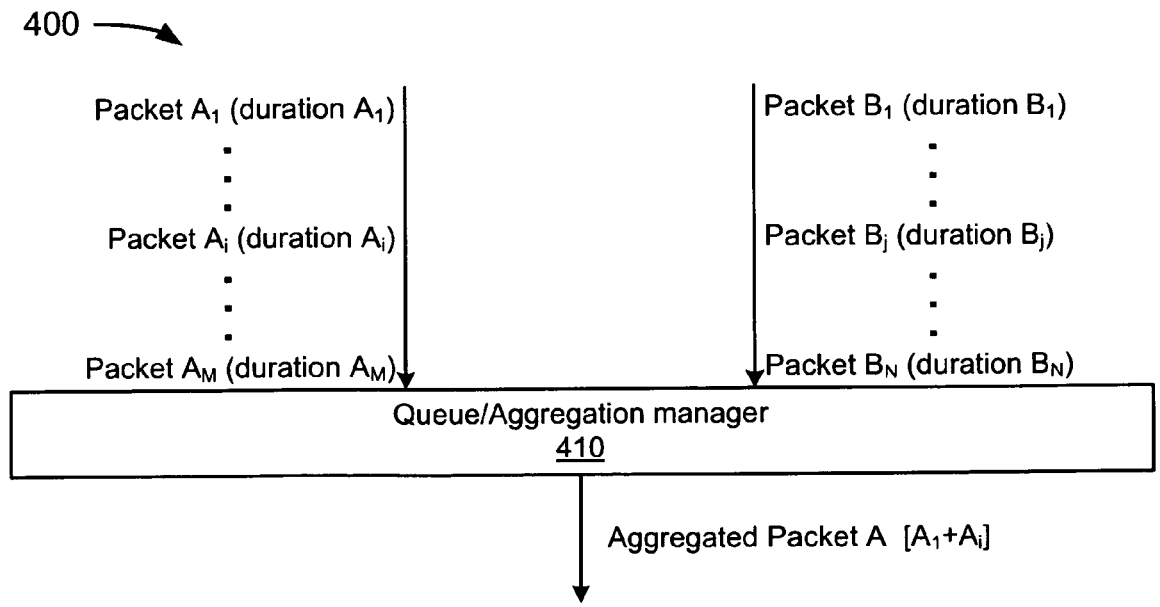
FIG. 4 depicts an example of a system including an aggregation/queue manager that maintains timings for several packets relatively deep in a queue.

FIG. 4 depicts an example of a system 400 including an aggregation/queue manager 410 that maintains timings for several packets relatively deep in a queue. Advantageously, this facilitates fitting the largest possible packet into the available gap of airtime. In the example of FIG. 4, two incoming stations (A and B) are sending packets, and each packet has an expected duration. For illustrative purposes, the packets from station A are numbered $A_1$ to $A_M$ and the packets from station B are numbered $B_1$ to $B_N$ and the packets from station A and station B have respective durations $A_1$ to $A_M$ and $B_1$ to $B_N$. The aggregation/queue manager 410 knows that it may transmit a packet to A with duration $A_1$, but if the gap is large enough, it can transmit an aggregate frame to A with duration $A_1+A_i$. Presumably, if $A_2$, since it would be the next in the queue would be the first choice for aggregation with $A_1$, but since $A_2$ might be larger than is allowed, in general, where aggregation is possible, $A_1$ is aggregated with $A_i$.

Knowing when the medium is busy may help the aggregation/queue manager 410 schedule transmissions. Communicating that information to client devices may help further reduce overhead and improve service by letting other stations know how large the scheduled gaps are. Two methods of communicating this are illustrated in FIGS. 5A and 5B.

Figure 5A:
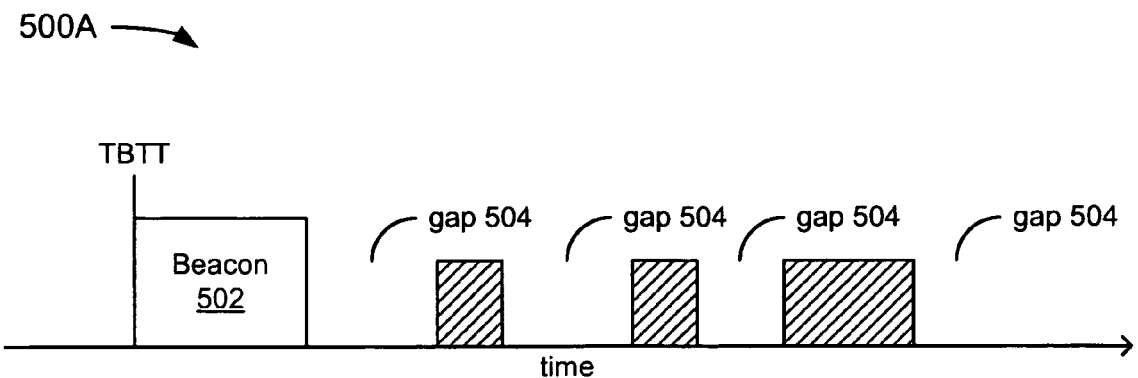
FIGS. 5A and 5B depict diagrams illustrating a map describing when a medium is predicted to be busy.

FIG. 5A depicts a diagram 500A illustrating a beacon map describing when a medium is predicted to be busy. In an illustrative embodiment, a beacon packet 502 is transmitted at a Target Beacon Transmission Time (TBTT). In the beacon packet 502, there is a map that describes when the medium is predicted to be busy. An AP fills in this map based on, by way of example but not limitation, TSPEC reservations. Client stations could read the gaps 504 in the map and use that to size aggregates appropriately.

Figure 5B:
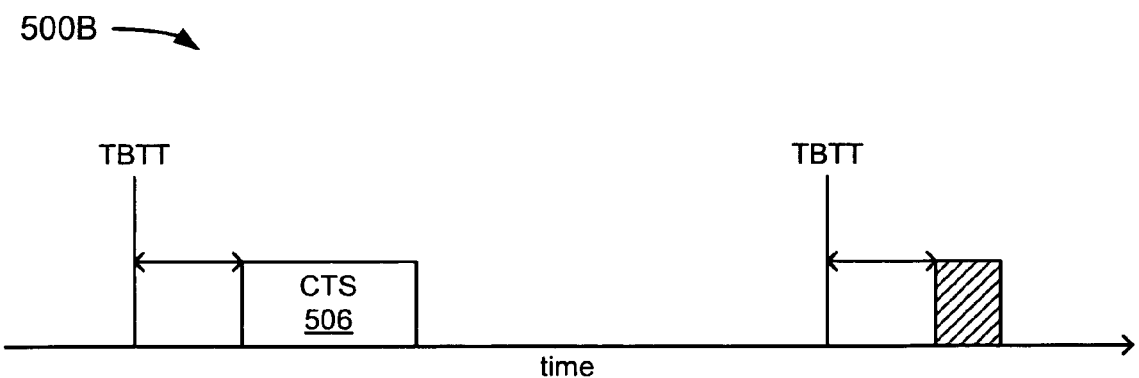

FIG. 5B depicts a diagram 500B illustrating an RTS or CTS packet map describing when a medium is predicted to be busy. The example of FIG. 5B illustrates what may in some implementations be a more distributed approach than that of FIG. 5A. In an illustrative embodiment, an RTS or CTS packet has a "repetitive" flag option. A station transmits a CTS 506 that specifies a time at which a packet having an associated duration will be transmitted after every beacon. Every station that hears the CTS should then be able to build a map with a transmission at that point after the beacon.

Figure 6:
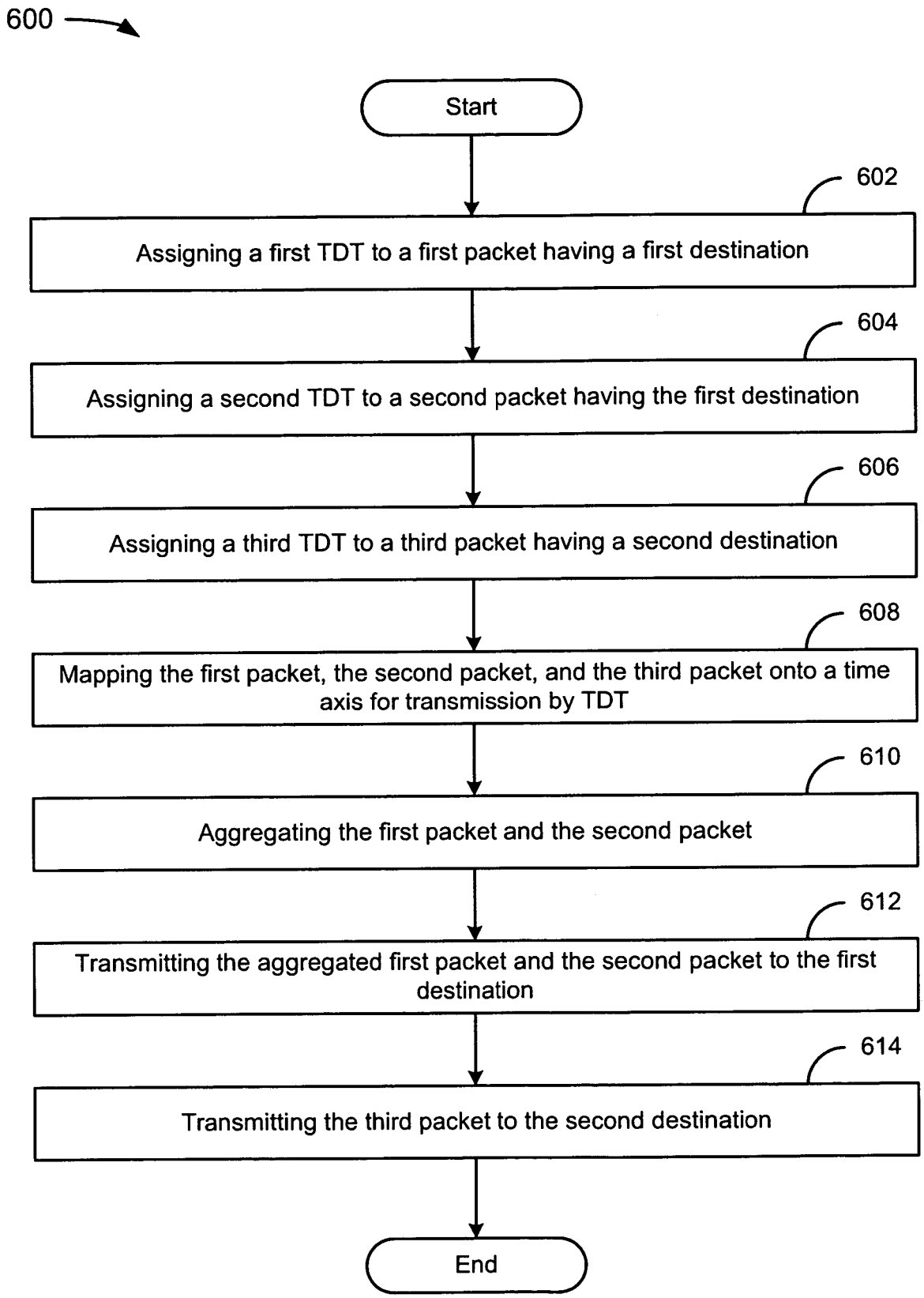
FIG. 6 depicts a flowchart of an example of a method.

FIG. 6 depicts a flowchart 600 of an example of a method for packet aggregation and queuing. This method and other methods are depicted as serially arranged modules. However, modules of the methods may be reordered, or arranged for parallel execution as appropriate. In the example of FIG. 6, the flowchart 600 starts at module 602 where a first TDT is assigned to a first packet having a first destination.

In the example of FIG. 6, the flowchart 600 continues to module 604 where a second TDT is assigned to a second packet having the first destination. Notably, in this example, the first packet and the second packet have the same destination. This is important because packets being sent to different destinations from an AP in a wireless network would not likely be aggregated. It may be noted, however, that the first destination may be a next hop for one or both of the first and second packets, and the first and second packets could have different final destinations.

In the example of FIG. 6, the flowchart 600 continues to module 606 where a third TDT is assigned to a third packet having a second destination. In this example, the first packet and the third packet are assumed to have earlier TDT or priority than the second packet. If the first packet and the third packet were being sent to the same destination, then the third packet, which has a higher priority than the second packet, would be more appropriately aggregated with the first packet. Accordingly, this example assumes that the third packet has a different destination from that of the first packet and the third packet.

In the example of FIG. 6, the flowchart 600 continues to module 608 where the first packet, second packet, and third packet are mapped onto a time axis for transmission by TDT. As has been mentioned, it is assumed that the first and third packets have higher priority than the second packet. Accordingly, the first and third packets would be mapped before the second packet in the TDT. Thus, the order on the time axis could be either first packet-third packet-second packet or third packet-first packet-second packet.

In the example of FIG. 6, the flowchart 600 continues to module 610 where the first packet and the second packet are aggregated. If the first packet precedes the third packet in the time axis, then the aggregation would be a tail aggregation (i.e., the second packet would be appended to the first packet). If the third packet precedes the first packet in the time axis, then the aggregation would be head aggregation. As described previously, the second packet would not necessarily be prepended to the first packet in the case of head aggregation, since it may be desirable for the first packet to be first in the aggregated packet.

In the example of FIG. 6, the flowchart 600 continues to module 612 where the aggregated first packet and the second packet are transmitted to the first destination, and to module 614 where the third packet is transmitted to the second destination. If the first packet preceded the third packet in the time axis, then the aggregated packet may be sent before the third packet (i.e., 612 then 614). If the third packet preceded the first packet in the time axis, then the third packet may be sent before the aggregated packet (i.e., 614 then 612).

As used herein, a wireless network refers to any type of wireless network, including but not limited to a structured network or an ad hoc network. Data on a wireless network is often encrypted. However, data may also be sent in the clear, if desired.

As used herein, access point (AP) refers to receiving points for any known or convenient wireless access technology. Specifically, the term AP is not intended to be limited to 802.11 APs.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and techniques described herein also relate to apparatus for performing the algorithms and techniques. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

As used herein, the term "basic service set identifier" (bssid) has a particular meaning in the art. That is, a bssid is at least associated with each AP. The "service set identifier," on the other hand, is assigned to all of the APs of a network. It should be noted, however, that these terms are simply labels, and that, depending upon implementation details or technology, different terms may be used. Accordingly, with the intent to capture the general meaning of an identifier for an AP, the term AP identifier (AP ID) is used in the claims, and it should be understood that a wireless domain that includes the AP IDs is, in at least some embodiments and implementations, to have a name (i.e., the equivalent of an ssid).

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system comprising:
an access point (AP), including:
one or more ingress queues;
one or more egress queues;
an aggregation and queuing engine coupling the ingress queues to the egress queues;
radio hardware coupled to the egress queues;
wherein, in operation, the aggregation and queuing engine:
assigns target delivery time (TDT) to a first packet having a first destination, a second packet having the first destination, and a third packet having a second destination in the ingress queues,
maps the first packet, the second packet, and the third packet onto a time axis for transmission by TDT, where the first packet and the third packet are adjacent on the time axis,
if a gap between the first packet and the third packet in the time axis is large enough that aggregating and sending the first packet and the second packet allows the first packet to be sent in the first packet TDT and the third packet to be sent in the third packet TDT:
aggregates the first packet with the second packet,
enqueues the aggregated first packet and second packet on the egress queues, and
enqueues the third packet, after the aggregated first packet and second packet, on the egress queues,
wherein, in operation, the radio hardware dequeues and sends packets enqueued on the egress queues.

2. The system of claim 1, further comprising a distribution system coupled to the AP.

3. The system of claim 1, further comprising a plurality of stations coupled to the AP.

4. The system of claim 1, further comprising one or more stations wirelessly connected to the AP, wherein the one or more ingress queues are associated with the one or more stations.

5. The system of claim 1, wherein the one or more ingress queues each include a plurality of sub-queues associated with packet transmission priorities.

6. The system of claim 1, wherein each of the one or more egress queues is associated with each of a plurality of priorities.

7. The system of claim 1, wherein, the third packet immediately follows the first packet on the time axis, wherein, in operation, the aggregation and queuing engine:
appends the second packet to the first packet if the gap between the first packet and the third packet is large enough that appending the second packet and sending the first packet and the second packet allows the first packet to be sent in the first packet TDT and the third packet to be sent in the third packet TDT,
enqueues the third packet, after the first packet and appended second packet, on the egress queues.

8. The system of claim 1, wherein, a fourth packet immediately follows a fifth packet on the time axis, wherein, in operation, the aggregation and queuing engine:
assigns target delivery time (TDT) to the fourth packet having the first destination, and the fifth packet having the second destination in the ingress queues,
maps the fourth packet, the second packet, and the fifth packet onto a time axis for transmission by TDT, where the fourth packet and the fifth packet are adjacent on the time axis,
aggregates the second packet with the fourth packet if the gap between the fourth packet and the fifth packet is large enough that aggregating and sending the fourth packet and the second packet allows the fourth packet to be sent in the fourth packet TDT and the fifth packet to be sent in the fifth packet TDT,
enqueues the fifth packet, before the aggregated fourth packet and second packet, on the egress queues.

9. The system of claim 8, wherein the second packet is appended to the fourth packet.

10. The system of claim 1, wherein, in operation, the aggregation and queuing engine provides data to the radio hardware sufficient to inform at least one station regarding when a medium is predicted to be busy.

11. The system of claim 1, wherein the aggregation and queuing engine assigns acceptable delivery time (ADT) to the first packet, the second packet, and the third packet, wherein the ADT of the first, second, and third packets, at least includes the TDT of the respective first, second, and third packets, wherein the first packet is sent in the first packet ADT, the second packet is sent in the second packet ADT, and the third packet is sent in the third packet ADT.

12. The system of claim 1, wherein if a gap between the first packet and the third packet in the time axis is not large enough that aggregating and sending the first packet and the second packet allows the first packet to be sent in the first packet TDT and the third packet to be sent in the third packet TDT: the aggregation and queuing engine enqueues the first packet, the second packet, and the third packet on the egress queues.

13. A system comprising:
a means for:
assigning a first target delivery time (TDT) to a first packet having a first destination;
assigning a second TDT to a second packet having the first destination;
assigning a third TDT to a third packet having a second destination,
a means for mapping the first packet, the second packet, and the third packet onto a time axis for transmission by TDT, where the first packet and the third packet are adjacent on the time axis,
a means for determining that a gap between the first packet and the third packet in the time axis is large enough that aggregating and sending the first packet and the second packet allows the first packet to be sent in the first TDT and the third packet to be sent in the third TDT;
a means for aggregating the first packet and the second packet;
a means for:
transmitting the aggregated first packet and the second packet to the first destination;
transmitting the third packet to the second destination.

14. The system of claim 13, wherein, the third packet immediately follows the first packet on the time axis, wherein:
the means for aggregating further includes a means for appending the second packet to the first packet if the gap in the time axis between the first packet and the third packet is large enough that aggregating and sending the first packet and the second packet allows the first packet to be sent in the first TDT and the third packet to be sent in the third TDT,
the means for transmitting further includes a means for transmitting the third packet after transmitting the aggregated first packet and second packet.

15. The system of claim 13, wherein, the first packet immediately follows the third packet on the time axis, further comprising:
the means for aggregating further includes a means for aggregating the second packet with the first packet if the gap between the first packet and the third packet is large enough that aggregating and sending the first packet and the second packet allows the first packet to be sent in the first TDT and the third packet to be sent in the third TDT, the means for transmitting further includes a means for transmitting the third packet before the aggregated first packet and second packet.

16. The system of claim 15, wherein the second packet is appended to the first packet.

17. The system of claim 13, further comprising informing at least one station regarding when a wireless medium is predicted to be busy.

18. A method comprising:
assigning a first target delivery time (TDT) to a first packet having a first destination;
assigning a second TDT to a second packet having the first destination;
assigning a third TDT to a third packet having a second destination,
mapping the first packet, the second packet, and the third packet onto a time axis for transmission by TDT, where the first packet and the third packet are adjacent on the time axis,
determining that a gap in the time axis between the first packet and the third packet is large enough that aggregating and sending the first packet and the second packet allows the first packet to be sent in the first TDT and the third packet to be sent in the third TDT;
aggregating the first packet and the second packet;
transmitting the aggregated first packet and the second packet to the first destination;
transmitting the third packet to the second destination.

19. The method of claim 18, wherein, the third packet immediately follows the first packet on the time axis, further comprising:
appending the second packet to the first packet if the gap between the first packet and the third packet is large enough that aggregating and sending the first packet and the second packet allows the first packet to be sent in the first TDT and the third packet to be sent in the third TDT,
transmitting the third packet after transmitting the aggregated first packet and second packet.

20. The method of claim 18, wherein, the first packet immediately follows the third packet on the time axis, further comprising:
aggregating the second packet with the first packet if the gap between the first packet and the third packet is large enough that aggregating and sending the first packet and the second packet allows the first packet to be sent in the first TDT and the third packet to be sent in the third TDT,
transmitting the third packet before the aggregated first packet and second packet.

21. The method of claim 20, wherein the second packet is appended to the first packet.

22. The method of claim 18, further comprising informing at least one station regarding when a wireless medium is predicted to be busy.

* * * * *